(12) United States Patent
Minemura et al.

(10) Patent No.: US 6,184,879 B1
(45) Date of Patent: Feb. 6, 2001

(54) MULTI-MEDIA TITLE EDITING APPARATUS AND A STYLE CREATION DEVICE EMPLOYED THEREFOR

(75) Inventors: Atsushi Minemura, Kashiwa; Makoto Sato, Funabashi; Kayoko Asai, Tokyo, all of (JP)

(73) Assignee: Matsushita Electric Industrial Co., Ltd., Tokyo (JP)

( * ) Notice: Under 35 U.S.C. 154(b), the term of this patent shall be extended for 0 days.

(21) Appl. No.: 09/361,131

(22) Filed: Jul. 27, 1999

Related U.S. Application Data (63) Continuation of application No. 08/828,900, filed on Mar. 31, 1997, now abandoned.

(30) Foreign Application Priority Data

Apr. 26, 1996 (JP) ....................................................... 8-107774

(51) Int. Cl.⁷ .................................................. G06F 15/00
(52) U.S. Cl. ........................................... 345/328; 345/333
(58) Field of Search .................................... 345/326, 328, 345/302, 333, 334, 339, 348, 352, 967

(56) References Cited

U.S. PATENT DOCUMENTS

| | | | |
|---|---|---|---|
| 5,608,859 | * 3/1997 | Taguchi | 345/302 |
| 5,613,057 | * 3/1997 | Cavavel | 345/302 |
| 5,630,131 | * 5/1997 | Palevich et al. | 345/326 X |
| 5,659,793 | * 8/1997 | Escobar et al. | 345/302 |
| 5,666,554 | * 9/1997 | Tanaka | 345/302 |
| 5,675,752 | * 10/1997 | Scott et al. | 345/333 |
| 5,680,619 | * 10/1997 | Gudmundson et al. | 345/302 X |

* cited by examiner

*Primary Examiner*—Raymond J. Bayerl
*Assistant Examiner*—Cao H. Nguyen
(74) *Attorney, Agent, or Firm*—Lowe Hauptman Gopstein Gilman & Berner (57) ABSTRACT

The present invention aims to easily create multi-media title without requiring a high technique. A multi-media editing apparatus comprises: style creation 101 for creating a style that defines setups of all of layouts and display attributes; style storage 102 for storing a style acquired by the style creation element accumulation 103 for accumulating elements; element management 104; style interpretation 105 for interpreting a style; user input 107 for creating a title; and scenario storage 109 for storing a scenario of the title that is created.

10 Claims, 11 Drawing Sheets

```
#level, frame modifier type, horizontal position, vertical position, width,
height, data type, font (others)

1,3,20,100,80,text,13,black,white 2,4,80,100,300,120,moving picture,*

3,1,150,20,100,80,static picture ; moving picture ; text,13,black,white
```

```
display attribute information display attribute ID, level, frame modifier type, horizontal position,
 vertical position, width, height, font (others)

1,1,3,20,20,100,80,13,black,white
2,3,1,150,20,100,80
3,3,1,150,20,100,80
4,2,4,20,20,100,80,13,black,white
5,1,3,20,20,100,80 element information
1,Movie.mpg
2,Mojijyoho.txt
3,Color.bmp
4,Mojijyoho.txt action information
time, element ID, dispray attribute ID, action
10,1,3,display
25,2,1,display
40,3,2,display
45,2,1,non-display
60,2,4, display
70,3,5, display
```

MULTI-MEDIA TITLE EDITING APPARATUS AND A STYLE CREATION DEVICE EMPLOYED THEREFOR

This application is a Continuation of Application Ser. No. 08/828,900 filed Mar. 31, 1997 now abandoned.

BACKGROUND OF THE INVENTION

1. Field of the Invention

The present invention relates to an apparatus for creating and editing multi-media titles.

2. Description of Related Art

Recently, the focus has been on information service, and accordingly, the need for a system that can provide service has increased. Since multi-media data are handled by computers, as the performance of computers has improved, there has been an increase in the demands for a system that can create and can reproduce a multi-media title in order to mix the multi-media data and to disseminate information by the means of computers. Especially, because of the original property of information, it is demanded of recent information service systems that different information be provided repetitiously, over a short period of time. That is, there is a demand for a system that can repeatedly and easily create similar titles. In a conventional multi-media title editing and reproduction system, a time axis is employed as a basic axis. Along this axis, the editing and the reproduction of a title is conducted so as to perform an action, such as the display and the non-display of individual elements.

Figure 11:
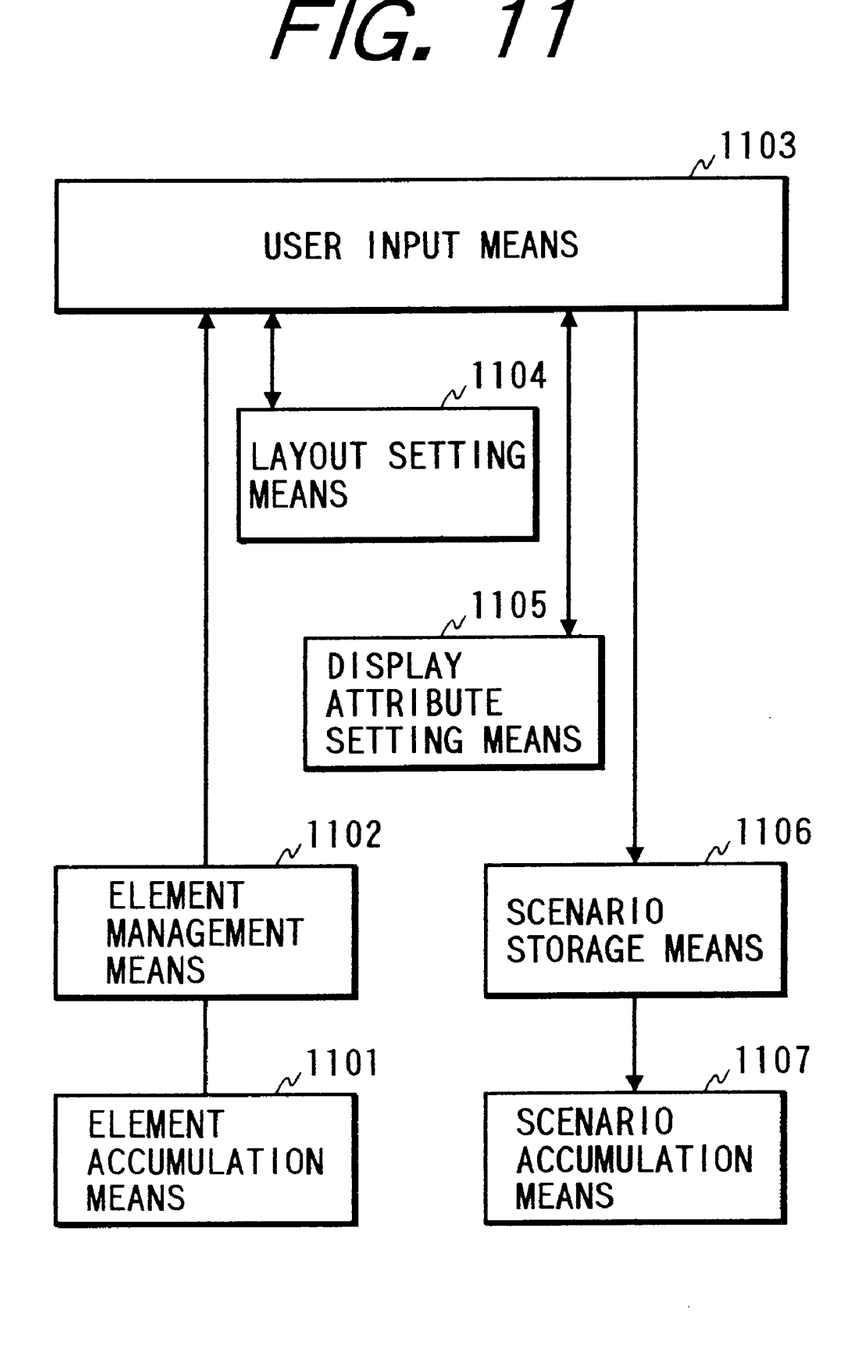
FIG. 11 is a block diagram illustrating the structure of a conventional multi-media title editing apparatus.

FIG. 11 is a diagram illustrating one conventional example of an apparatus for editing and reproducing multi-media titles. As is shown in FIG. 11, a conventional multi-media title editing apparatus comprises: element accumulation means 1101; element management means 1102; user input means 1103; scenario storage means 1106; scenario accumulation means 1107; layout setting means 1104; and display attribute setting means 1105. Using this arrangement, an explanation of the operation for creating and editing a multi-media title will now be given. First, a user employs the user input means 1103 to select an element in the element accumulation means 1101 that is managed by the element management means 1102. The selected element is displayed on the user input means 1103, e.g., a display. Then, the layout setting means 1104 is employed to set up the layout for the element. In the layout are included a position at which the element is to be displayed, i.e., positions X and Y on the display, and the size of the displayed element, i.e., the width and the height. As the method to be used for the setup, there is one method whereby a layout is set up using a mouse in a WYSIWYG (What You See Is What You Get: data are output as they are displayed on a screen) manner while monitoring a positional relationship on the screen, and there is another method that provides the input of values for positions, etc., directly, by using a keyboard.

Further, the display attribute setting means 1105 is used to set the display attributes for the element. The display attributes represent various setups, such as an element display method and an element modifier method. If the display element is a moving picture, its display attribute is the setting of drawing frame speed; if the display element is a static picture, the display attribute is the setting for the limited number of colors to be used; if the display element is text, the attributes are the settings for the character font type and size, and for the colors of characters and the background; if the display element is a speech element, the attributes are the settings for the volume and for the balance on right and left sides; and if the display element is an animation, the attributes are the settings for the speed for drawing frames, for the frame modifier that encloses the display element, and for the display level. The display level indicates the position of an element relative to the lowermost location in the display when several elements are stacked and displayed. A method for selecting one of the setups from a selection list, or a method for inputting a value directly at a keyboard can be employed as the method for setting the display attributes.

These operations are performed each time an element is added to a title until finally, the scenario storage means 1106 is used to store the scenario for a title that is created. As is described above, each time a display element is selected, the conventional multi-media title creation and editing apparatus determines a layout for defining the display position and the size of the element, and the display attributes to be used for representing the display method and the modifier method for the element.

Although the conventional multi-media title creation and editing apparatus can have a high degree of freedom for an expression method and can provide an expression at a high level, it requires a user to simultaneously perform the selection of an element when a title is to be created, the definition of a layout, such as the display position and the size of the element, and the detailed definition of a display method, such as the display attributes for the element. Therefore, the procedures for the performance of the job are difficult to understand, and cannot be handled unless a user is technically skilled. Further, the conventional title creation and editing apparatus disables recycling, such as the repetitive use of only the layout for the title that was created, or its display attributes. When it is desired that the title is to be created frequently, each time an element to be displayed on the title is changed, the layout and the display attribute must be set, which requires much labor. Since new information must be sequentially provided when using a multi-media title, the layout and the display attribute of a title that is determined once must be easy to use repeatedly.

SUMMARY OF THE INVENTION

To overcome the above shortcomings, it is an object of the present invention to provide a multi-media title creation and editing apparatus that can easily and repeatedly create an expressive multi-media title without requiring great technical skills for its use.

According to the present invention, the layout setup that is performed each time an element to be displayed with a title is selected, and the setup of all the attributes that is performed for all of the display elements, both of these setups being ones that are performed with the conventional multi-media title creation and editing apparatus, are in total and in general called a style setup. The definition of a style setup, i.e., the definitions of the layout setup and attribute setup, is called a style. In addition, according to the present invention, the style is prepared in advance, so that a user can employ this style to create or edit a title. This indicates that the layout setting and the display attribute setting, which are performed by a conventional system during the creation of a title, should be completed before a title is created. A user can set the layout and the display attributes by using this style. As for the structure, the layout setting means and the display attribute setting means of a conventional system are combined, and together form single means for determining a style, this means being provided outside the conventional multi-media title creation and editing apparatus. This indicates that the job involving the creation of a style is performed independently of the job involving the creation of a multi-media title, and this differs greatly from the functioning of the conventional system.

To achieve the above object, the following matters are important.

1. A user must use a style that is created and registered in advance by a skilled user in order to simplify the style setup. To repeatedly create a title using the same style, even after a title is completed, the layout information and display attribute information for a title that is created must be recycled when the next title is created. To make various styles available, the style has not only to be stored in the multi-media title editing apparatus, but must also be exchanged and distributed as one of the elements with the other apparatuses.

2. It is important, at the time of creation of a title, to provide support for a user so that the title is easily created.

3. A level for displaying an element that makes a title more expressive must be one that is easily designated so that an expressive title can be created easily.

4. It is important, even when a style that is already registered is employed again to create another title, that a title can be created without having a designated display position and size so defined according to the style that do not match the vertical and horizontal ratio and the size of an element to be displayed and the element can not be displayed appropriately.

5. As well as the other elements, a plurality of styles have to be used in an identical title in consonance with the time that has elapsed since the title was reproduced.

The requirements for accomplishing the above matters are as follows.

(1) A job for creating a style, a job which defines a layout and a display method, must be independently performed independently of a title creation job, and an acquired style must be employed as an element for creating a title.

(2) In the creation of a title, a display area in which a selected element can be displayed must be provided for user input means to support a user to create a title.

(3) A display level of an element must be set using a style by a user while the layout and display attributes of the element can be set.

(4) In creation of a title, when a display element is set in a display area, the position and the size of the display area that is described in the style must be re-determined in consonance with the element so as to appropriately display the element.

(5) When a plurality of styles are employed with the same title, the modes of styles, such as the number of displayable elements and the display attributes, differ between before and after the styles are changed. It may happen that, after the styles are changed, the element that has been displayed can not to be continuoue displayed, and occurring mismatching must be resolved.

To respond to the above requirements, according to the present invention, provided is an apparatus, for creating and editing a multi-media title, that has the following arrangement:

(1) Style creation means, for creating a style that defines the layout of a screen of a multi-media title by using a display area set that designates a display method for various multi-media data, and style storage means for storing a created style are provided, and are connected to element accumulation means.

(2) The style creation means creates a style in which the layout is defined, including the multi-media data types that are to be displayed in individual display areas, and data comparison means is provided for determining whether or not the data type of an element matches a data type designated in the display area.

(3) The level attributes of the display areas are totally defined as a style, and style creation means and style storage means are provided to create such a style. It is assumed that the individual display areas belong to respective display levels, and that user input means fixes the individual areas in the designated display levels and displays them.

(4) Between the user input means and scenario storage means is provided style determination means for re-determining the positions and the sizes of display areas when elements to be displayed on the display areas are determined.

(5) The scenario storage means is provided for writing a scenario by assuming that, when a plurality of styles are employed in an identical title in consonance with the time that has elapsed since title reproduction, all of the elements that have been displayed are not displayed at the time at which the styles are changed.

According to the present invention, a style creation apparatus comprises: style creation means for creating a style in which a multi-media title screen is defined by using a set of display areas in which display methods for various multi-media data are designated; style storage means for storing the style that is created by the style creation means; and style file output means for storing style information as a file, and for outputting an acquired style as a file.

According to another aspect of the present invention, a multi-media title editing apparatus comprises: style creation means for creating a style in which a multi-media title screen is defined by using a set of display areas in which display methods for various multi-media data are designated; style storage means for storing the style that is created by the style creation means; element accumulation means for accumulating elements; element management means; style interpretation means for interpreting the style; user input means for creating a title; and scenario storage means for storing a scenario for the title. In this invention, the style storage means, for forming style information from the style creation means and outputting the resultant information to the element management means, is connected to the element accumulation means, and the acquired style is temporarily accumulated in the element accumulation means and treated as one type of element. The style creation means sets areas in which the elements are to be displayed as display areas, and different layout information and display attribute information are additionally displayed in the display areas. The layout information that is attached is assumed to be information concerning the layout of each own display area. The display attribute information is set to each of the display areas. The attribute information that defines at least one display area is defined as a style, which is created by the style creation means. When an element is designated to each of the display areas, the user input means automatically applies the layout information and the display attribute information of the display areas relative to their elements.

According to yet another aspect of the present invention, in the multi-media title editing apparatus hereinabove described the style creation means creates a style that defines a layout, including the designation of a data type of multi-media data that are to be displayed on the display areas, and data comparison means is provided for determining whether or not a data type of the element matches the data type that is designated for the display area. In this invention, the data comparison means receives a selected element type from the user input means and a data type to be displayed in each display area from the style interpretation means, compares the data types to determine whether or not they are matched, and instructs the user input means to highlight the data types when they are matched.

According to still another aspect of the present invention in the multi-media title editing apparatus hereinabove described the style creation means employs, as one part of the style, information that concerns display levels for the display areas, and the user input means provides a display in display areas in consonance with the display levels. In this invention, the style interpretation means receives the style from the element accumulation means to interpret definitions of the display attributes, such as positions, sizes and display levels of the display areas, and instructs the user input means to provide a display in the display areas.

According to yet another aspect of the present invention in the multi-media editing apparatus herein above described there is provide style determination means for, before a multi-media title is to be created and when the elements to be displayed in the display areas are determined, re-determining attribute information concerning positions and sizes, etc., of the display areas. The information from the user input means for selected elements and layout information for the display areas for which the elements to be displayed are designated are regarded as input, and according to a certain rule based on the information of the elements, the layout information of the display areas are re-determined and output to the user input means.

According to yet another aspect of the present invention in the multi-media title editing apparatus when a plurality of styles are employed with a particular title, the scenario storage means stores a scenario by assuming the time at which the styles are changed as the time at which any of the elements that have been displayed and vice versa are not displayed. In this invention, the scenario storage means employs, as input, the time, at which the style is changed, that is received from the user input means, along with information of the elements that have been displayed, and creates a scenario so as not to display at the style change time any of the elements that have been displayed.

According to yet another aspect of the present invention, there is provided a multi-media title edition system including a multi-media title editing apparatus, which comprises first style creation means, for creating a style that defines a multi-media title screen by using a display area set in which display methods for various multi-media data are displayed, first style storage means, for storing the style acquired by the style creation means; element accumulation means for accumulating elements, element management means, style interpretation means for interpreting the style, user input means for creating a title, and scenario storage means for storing a scenario of the title that is created; style accumulation means, which is connected to the multi-media title editing apparatus across a network; second style creation means, as well as the first style creation means, for creating a style that defines a multi-media title screen by using a display area set for which methods for displaying various multi-media data are designated; and second style storage means, as well as the first style storage means, for storing the style that is created by the second style creation means, both of the second style creation means and the second style storage means communicating with the multi-media title editing apparatus and the style accumulation means across the network. The acquired style is output form the style storage means to the style accumulation means, and. the element accumulation means in the multi-media title editing apparatus refers to the styles in the style accumulation means.

BRIEF DESCRIPTION OF THE DRAWINGS

These objects and features of the present invention will become more readily apparent from the following detailed description of the preferred embodiments taken in conjunction with the accompanying drawings in which.

DETAILED DESCRIPTION OF THE INVENTION

Embodiments of the present invention will now be described while referring to FIGS. 1 through 8.

Embodiment 1

Figure 1:
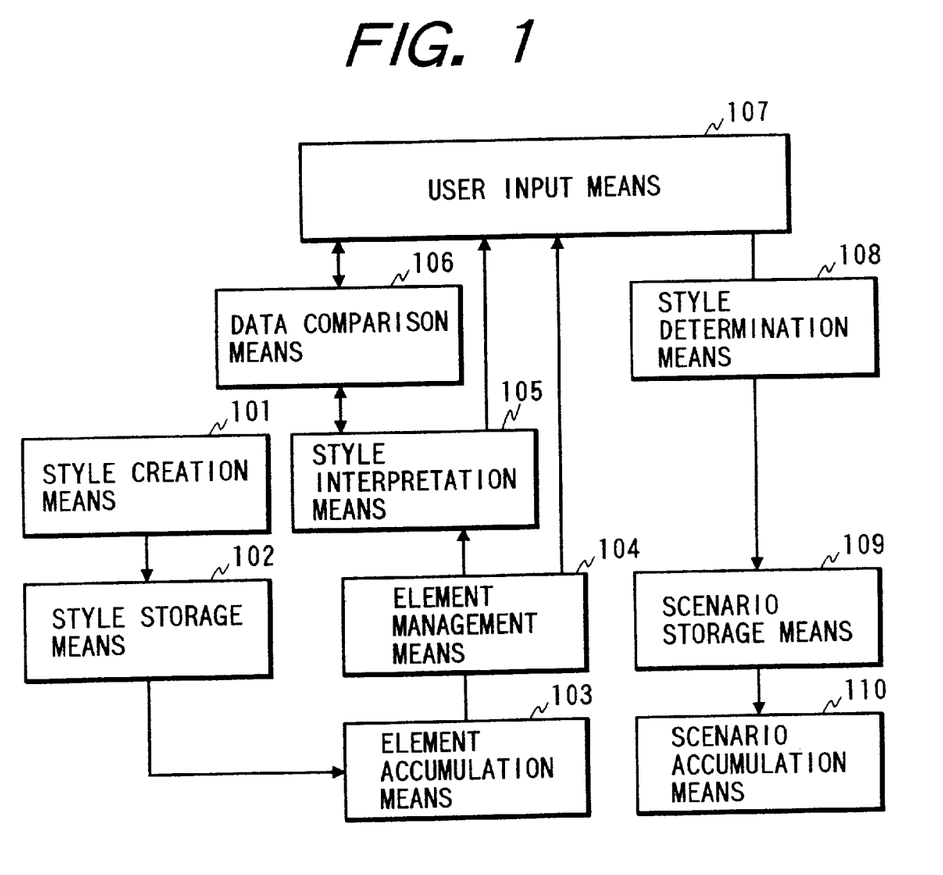
FIG. 1 is a block diagram illustrating the structure of a multi-media title editing apparatus according to a first embodiment of the present invention.

FIG. 1 is a block diagram illustrating the configuration of a multi-media title editing apparatus according to a first embodiment of the present invention. This embodiment is characterized by connecting style creation means, for defining a style, and style storage means, for employing information of a completed style as one of a plurality of stored therein elements, to element accumulation means. As a style, are defined layout information, such as positions and sizes of display areas in which various data are displayed, and display attribute information, such as designated modifiers for the frames of the display areas, designated displayable multi-media data types, and designated font types. The designated data types are, for example, data for a moving picture, a static picture, text, or speech. Moving picture data types are those with extensions, such as mpt, avi and mov.

In FIG. 1, reference numeral 101 denotes style creation means for creating a style that defines a screen layout of a multi-media title as a display area set in which methods for displaying various multi-media data are designated; 102, style storage means for storing a style that is created by the style creation means 101; 103, element accumulation means for accumulating elements of various types of multi-media data that constitute a title; 104, element management means for managing a style as one of elements; 105, style interpretation means for interpreting a style that is managed as one of elements by the element management means 104; 106, data comparison means for comparing a data type of a selected element with a data type that is designated in a style display area; 107, user input means that includes a touch panel display, a mouse, and a pointer so as to provide a graphical user interface for a user who creates a title; 108, style determination means for, when elements to be displayed on the display areas are determined, re-determining attributes such as the positions and the sizes of the display areas; 109, scenario storage means for storing a created title as a scenario; and 110, scenario accumulation means for accumulating scenarios that are created by the scenario storage means 109.

Figure 2:
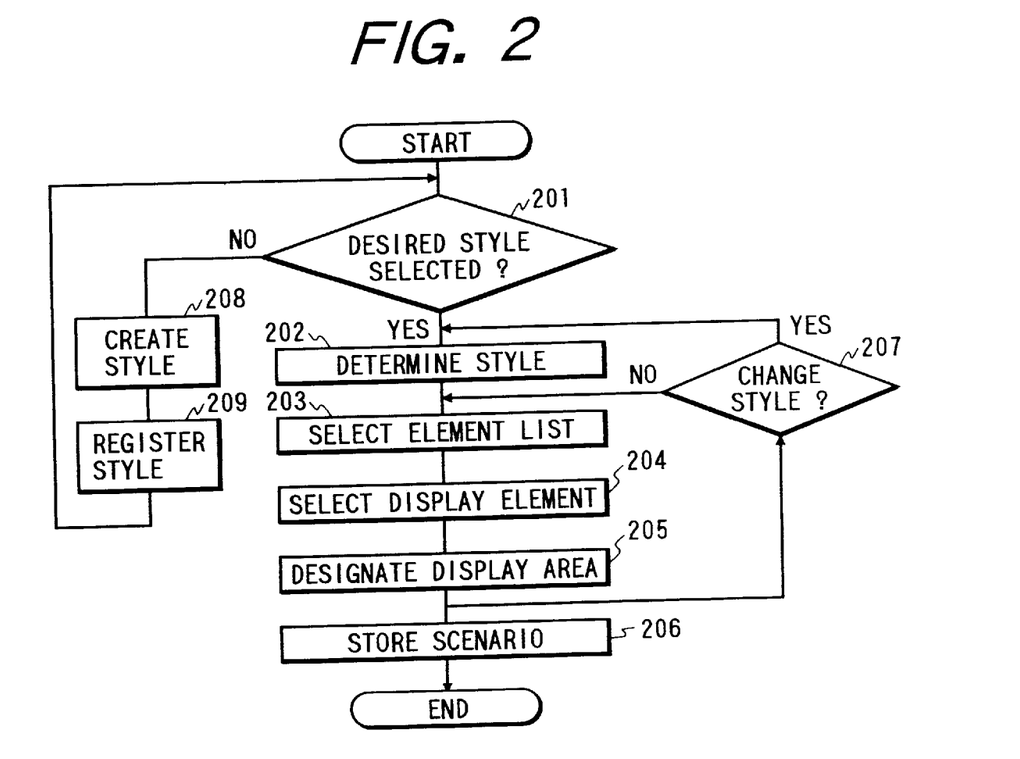
FIG. 2 is a flowchart for title creation processing performed by a user employing the multi-media title editing apparatus according to the first embodiment.

Before the internal processing of the present invention is described, first, an explanation will be given for how a user creates a title by using the multi-media title editing apparatus. FIG. 2 is a flowchart of the procedures for creating a title using the multi-media title editing apparatus.

The processing whereby a user creates a title will now be explained while referring to this flowchart. First, at processing step (hereinafter referred to simply as a "step") 201, a user selects a style to be employed from among styles that are registered as elements. The user examines the styles that are registered as elements to determine whether or not there is included in these elements a desired style, if such style is registerd, the user determines (identifies) that style (step 202). The selected style is displayed on the user input means 107, and a display is provided on all of the display areas that are defined in the style. Then, the base axial time of the title is advanced and halted at an arbitrary point, and a list is selected (step 203) in which elements to be displayed on the title are registered in advance.

According to this selection, from among all the display areas represented with the style, only those display areas where elements of the selected list can be displayed are highlighted.

The user selects from the list an element to be used, and designates one of the highlighted display areas to select a display element (step 204), and at the same time, designates the display area (step 205). At this time, the element is modified with display attributes, such as a display level, a font type, a character color and a background color, that are designated in the display area. The time at which each display area is designated in this way is stored as a lapse time starting from a reference time point, and the time information will be used when reproducing a title prepared and edited in advance in the above-mentioned manner such that corresponding elements will be displayed in a sequence determined by this time information. Following this, the above process is repeated to create a multi-media title. The style is handled in the same manner as another element, and to enable the creation of a title of which the style is changed as the time elapses, a check is performed to determine whether or not a style should be changed (step 207). If the style should be changed, program control moves to step 202 at which the style determination process is performed. If the style is not to be changed, program control moves to step 203, at which the element list is selected. When the style is changed during the repetitive processing, the acquired title is the one at which the style is changed at that time during the production of a title. A scenario is stored (step 206), and processing is thereafter terminated.

As is described above, since a user employs a style that is registered as an element in advance, not only can the layout design of a title be eliminated, but also an element can be automatically modified by employing display attributes, such as a display level position, a size, a position and a display color, all of which are designated for individual display areas. The individual display areas have display level attributes, and levels for a display are determined in advance by the attributes. The display areas are displayed according to the display level attributes. Therefore, when a user desires to display a specific element at the lower most level, he or she need only drop the element to the display area with the lowest display level.

To register a style in advance, program control need only shift from the style selection process (step 201) to the style creation process at which a style is created (step 208), and then a style registration process (step 209) is performed in advance. The detailed explanation will not be given here for procedures for creating a style and for registering it. An example for defining a style will be described later.

If, at step 201, there is no desired style and if a user is sufficiently skilled to create a style, it is obvious that the user creates a style at that time (step 208) and registers it (step 209), so that he or she can perform at one time the entire process from the design of a layout through the creation of a title. In addition, since even after a title has been created, the style that is used to create the title is still registered in the element accumulation means, the same style can be repetitively used to create a new title.

Figure 3:
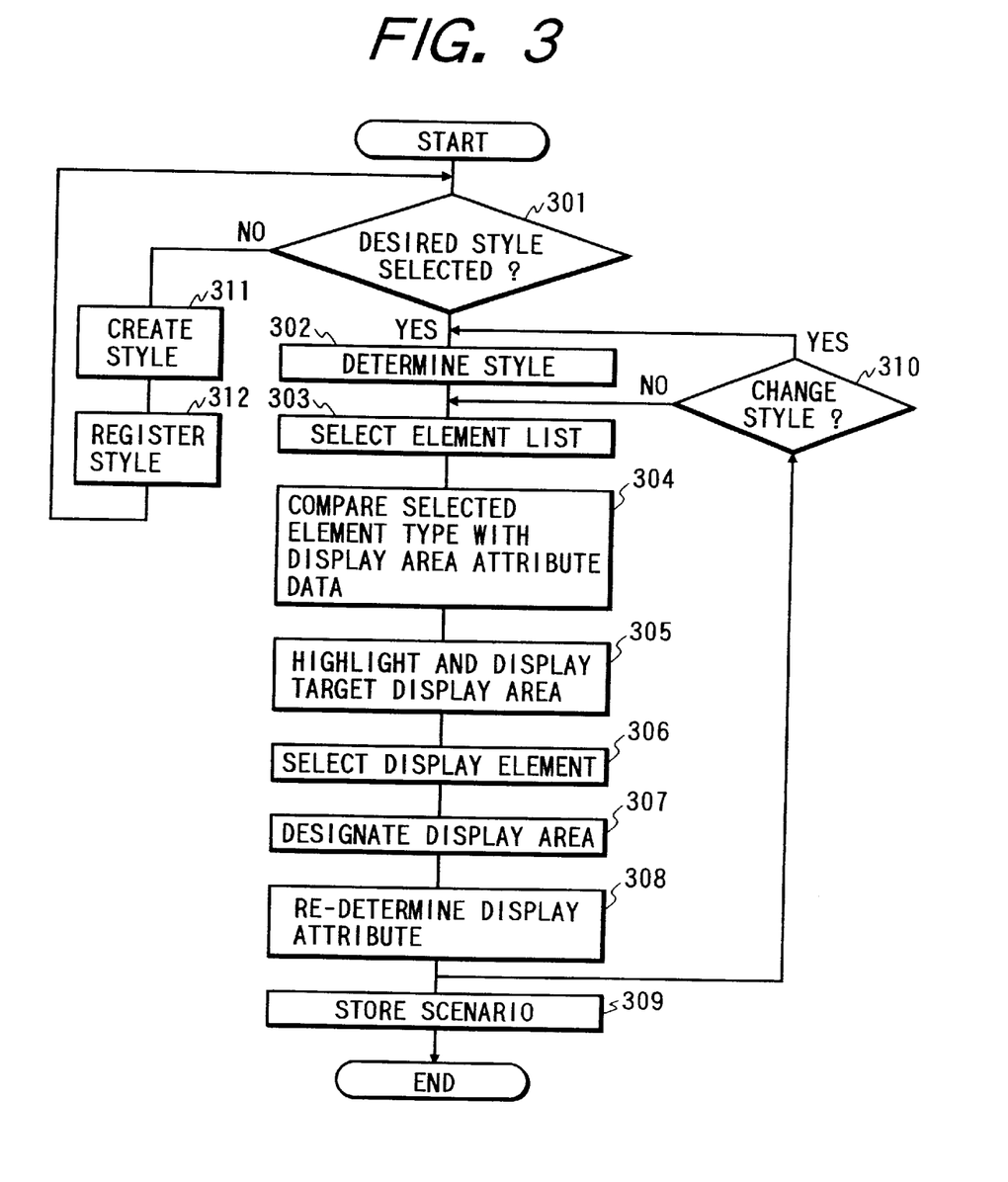
FIG. 3 is a flowchart for the entire operation of the title creation operation performed by a user shown in FIG. 2 and the processing of the multi-media title editing apparatus.

FIG. 3 is a flowchart of the entire operation and procedures of a mixture of the processing in FIG. 2 for creating a title by a user and the processing of the multi-media title editing apparatus. Since the procedures of the user's job are also referred to, the above described procedures of the user's job are also shown. The internal processing will now be described while referring to FIG. 3. First, the element management means 104 provides, for the user input means 107, symbols, such as icons, for data of elements, such as a moving picture, a static picture, text and a style, that are stored in the element accumulation means 103, so that a user can easily identify the data. The user selects a style, i.e., examines the styles if there is a desired one (step 301). If there is a desired style, the style is determined (step 302).

At this time, a designated style is reported to the element management means 104 by the user input means 107. Upon receipt of this, the element management means 104 extracts one of the styles from the element accumulation means 103 in which the styles are stored, and outputs it to the style interpretation means 105. The style interpretation means 105 interprets the style received form the element management means 104 by using the definition of the style, and the user input means 107 outputs the interpreted style in such a manner that a user recognizes it. In the user input means 107, the display areas are displayed as being defined in the style to present them to the user by using the graphical user interface. In other words, the vertical position, the horizontal position, the width and the height. of each display area are set as they are defined in the style. The element list is selected (step 303).

The element management means 104 provides the element list to the user input means 107 in accordance with the designation of the element list that is input from the user input means 107. The data comparison means interprets a current style through the style interpretation means 105, and compares the data type of the element list, which is input from the user input means 107, with the display data type of each display area, which is defined by the style that is input by the style interpretation means 105 (step 304). When as the result of comparison, the data types are the same, the user input means 107 is instructed to highlight and present a display area, indicating that a specific element on the selected element list can be displayed in that display area (step 305). As a result, the user can distinguish at a glance a display area in which a desired element can be displayed, and the suggestion of the performance of the next job can be provided to a user. Further, the definition of a style that has been registered in advance and the intent of a user that has created a style can be understood. Especially, when a style that has many display areas is employed, a user can quickly understand where and which type of data should be designated next.

Following this, the user selects an element from the selected element list (step 306), and designates one of the highlighted display areas (step 307). Until a specific element is selected, the display areas are presented as are defined by the style. Once the element is designated, however, the style determination means 108 acquires information concerning the width and the height of the selected element from the user input means 107. At the same time, information concerning the position and the size of a display element for which the element is designated. The style determination means 108 calculates the position and the size of the display area by two sets of the information according to specific rules, and outputs the acquired position and the size to the user input means 107. The user input means 107 employs the position and the size of the display area, which is re-determined and received, and display attribute information that is associated with the display area to modify the element and display it (step 308).

One of the rules can be such that the upper left, vertical position and the horizontal position of the display area are fixed as reference positions, and according to these positions, the size of the display area is adjusted to the size of the element. When the display area is smaller than the element, the element is reduced to the largest size of which can be displayed in the display area, while the rates of the width and of the height of the element are maintained. Another rule can be such that the size and the position of the element are changed by employing the center of the display area as a reference. Along the above process sequence, a user can consistently create a title in the WYSIWYG manner.

The operations at step 302 to step 308 are repeated, and a title is created. Finally, the scenario is stored (step 309), and the processing is thereafter terminated. In this process, the scenario storage means 109 receives information concerning the element that is employed, the display period of time, and the display area, from the user input means 107. Only the display area in which the element was actually displayed is selected from among all of the display areas that are defined in the style, and the display attribute information of the display area that was re-determined in the element designation process is output as a scenario. The information of the element that is employed and action information, such as the time at which the element is to be displayed, are also output as a scenario. The scenario description example will be explained later.

In the processes for creating and registering a style (steps 311 and 312), first, the style creation means 101 acquires the layout information and the display attribute information of the display area by the instruction of a user, and outputs them to the style storage means 102. The style creation means 101 also receives the designation of the display level of the display area from the user, and outputs it to the style storage means 102. Upon receipt of the information set from the style creation means 101, the style storage means 102 internally shapes the information set and outputs it as a style to the element accumulation means 103.

Figure 4:
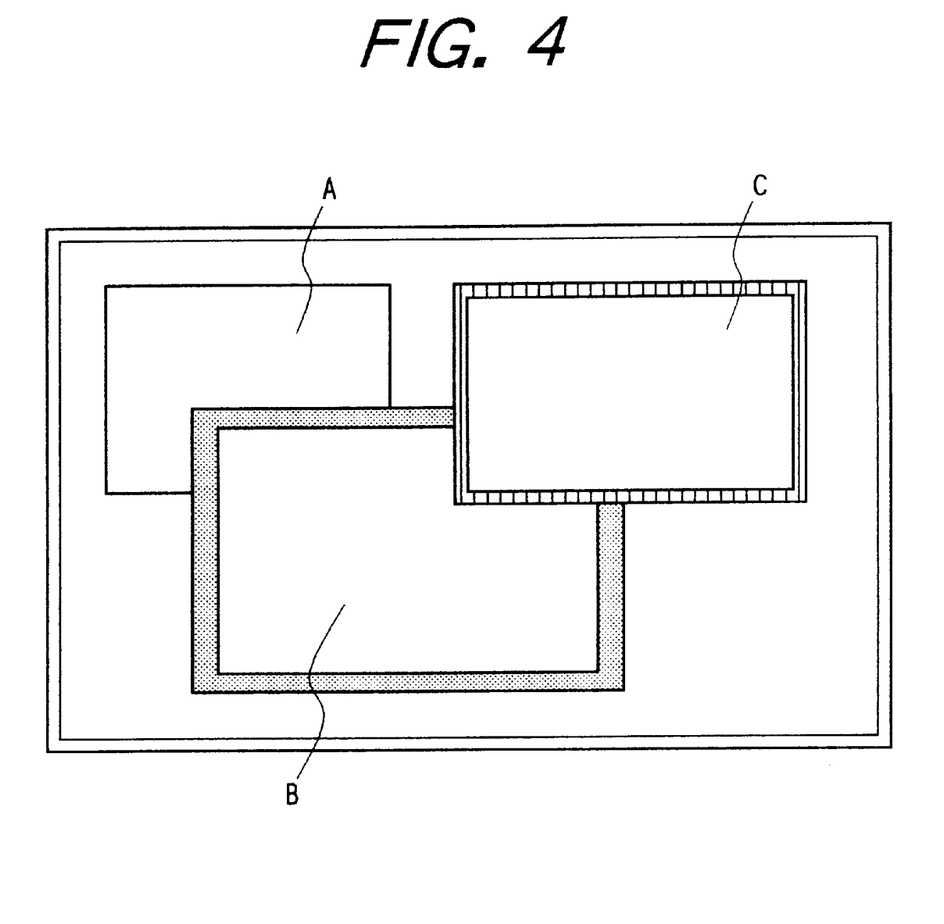
FIG. 4 is an image explanatory diagram illustrating an example style that is displayed by user input means according to the first embodiment.

Data concerning the process that has been explained in the internal processing will now be described. FIG. 4 is an image explanatory diagram illustrating one example style that is displayed by the user input means. In this example, three display areas are overlapped; area A of which the display level is lowest; display area C of which the display level is the highest; and areas B and C that have different modifiers around their frames.

Figure 5:
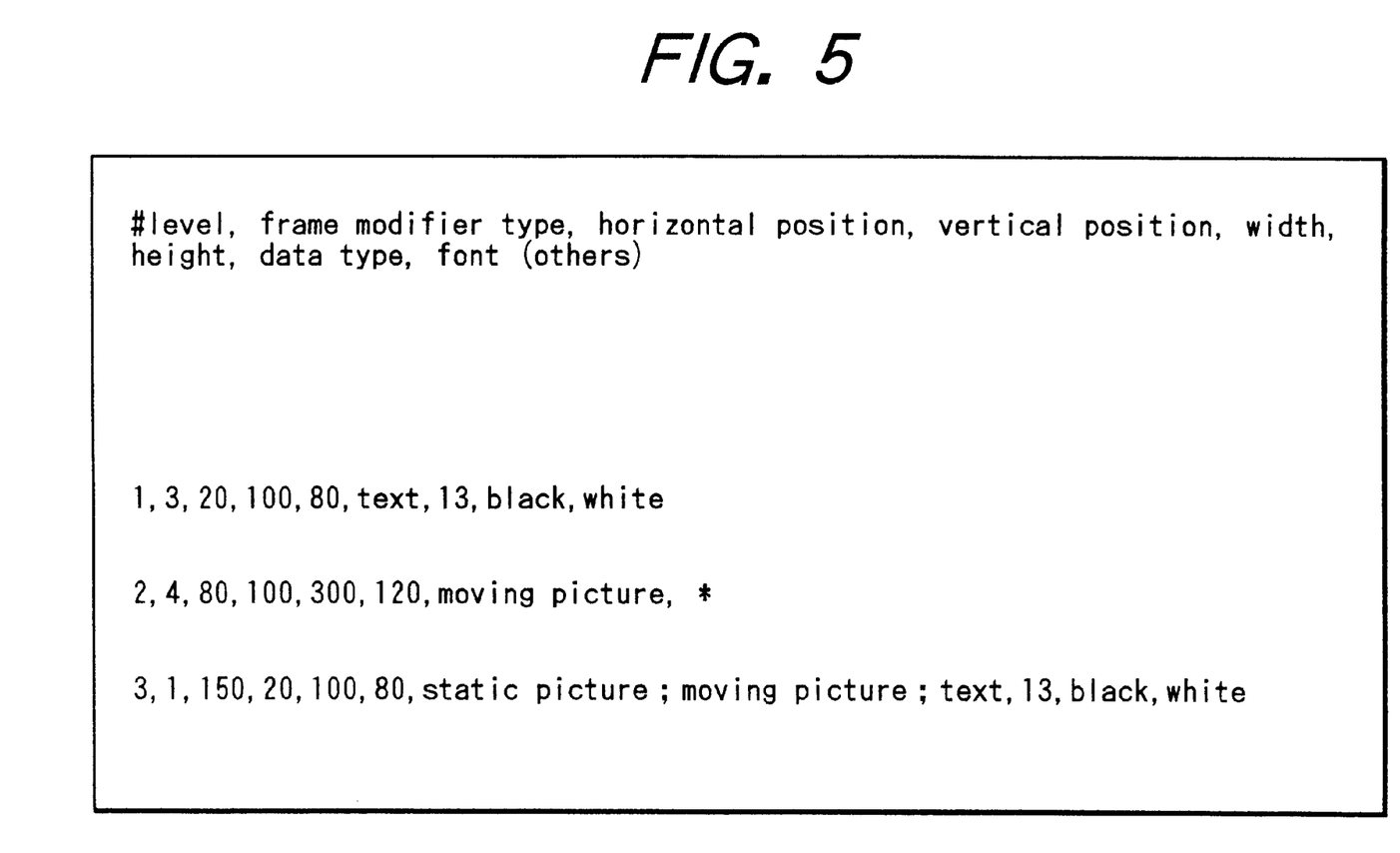
FIG. 5 is a diagram illustrating an example description of a style that defines a layout shown in FIG. 4 according to the first embodiment.

FIG. 5 is a diagram showing an example style description by which the layout shown in FIG. 4 is defined. The example style description will now be explained while referring to FIG. 5. As a style, for each display area are written attributes, such as a display level, a frame modifier type, a horizontal position (X position), a vertical position (Y position), a display area width, a display area height, a data type displayable in a display area, and a font (others). The first line in FIG. 5 represents that the display area at the lowermost level is a display area for text data, a font is 13 points, a character color is black and a background color is white, and the frame of the display area is modified with modifier type No. 3. The second line represents that the display area at the second lowest level is for a moving picture display. The third line represents that the display area is a display area in which any one of a static picture, a moving picture and text can be displayed.

Figure 6:
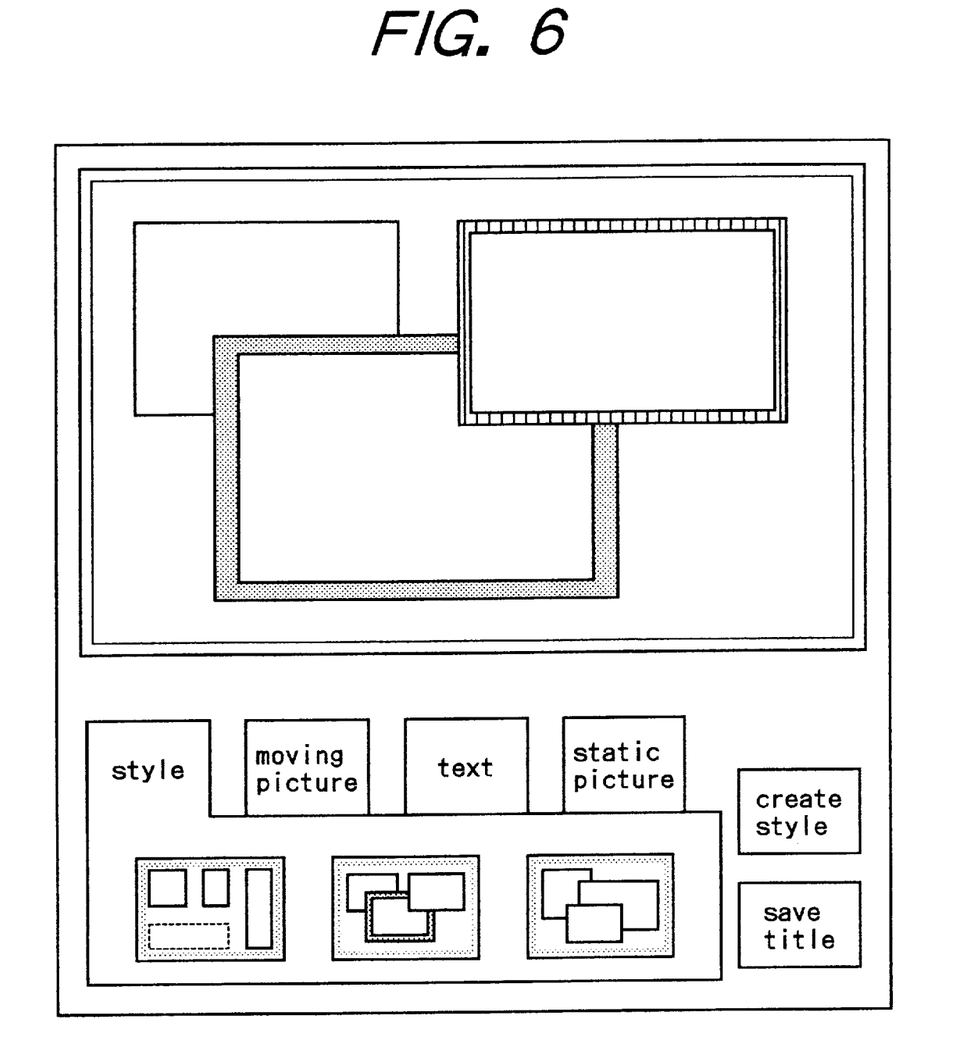
FIG. 6 is an image explanatory diagram illustrating an example graphical user interface display that the user input means provides for a user according to the first embodiment.
Figure 7:
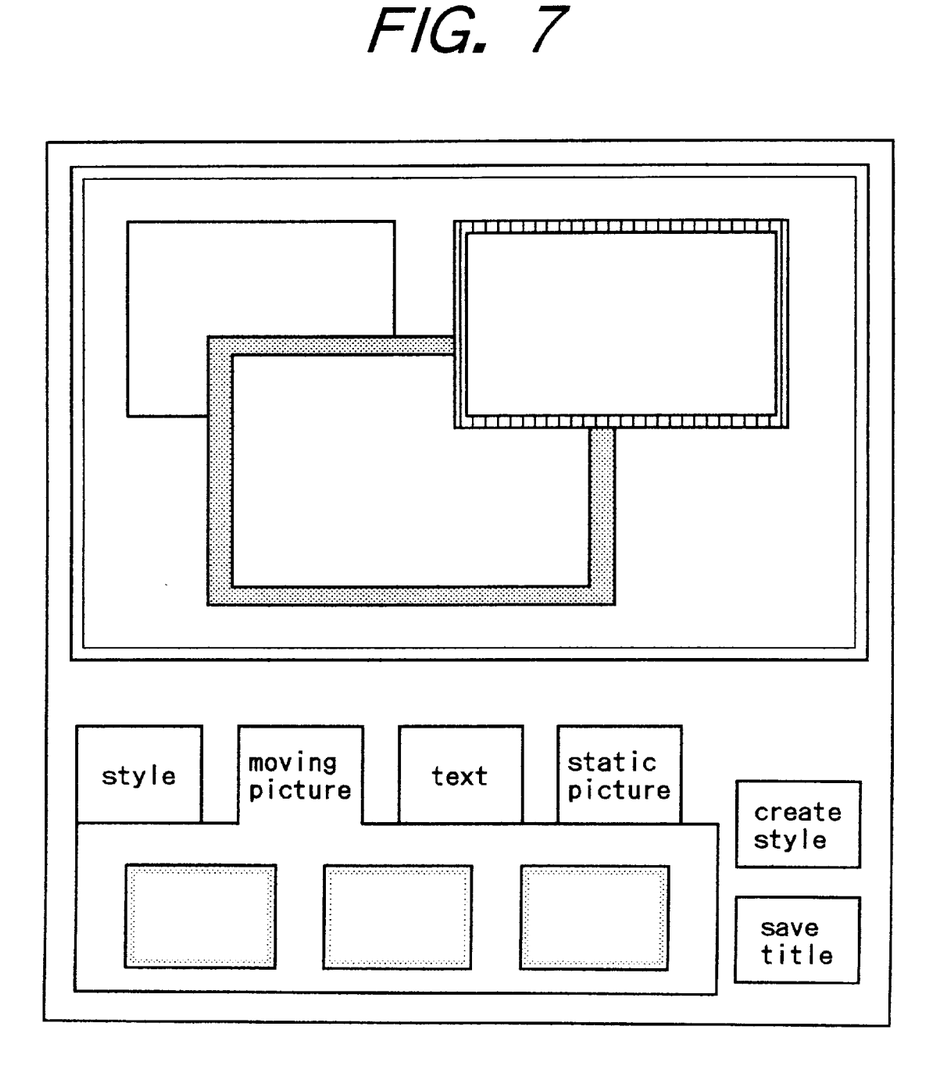
FIG. 7 is an image explanatory diagram illustrating a screen display of the user input means when a style has been selected and an element is to be selected according to the first embodiment.

FIG. 6 is an image explanatory diagram illustrating a display example of a graphical user interface that the user input means provides for a user. This example indicates the condition where a style is to be selected. FIG. 7 is an image explanatory diagram illustrating the screen of the user input means when the style has been selected and an element is to be selected. The style is displayed at the upper portion of the graphical user interface, and this portion serves as a portion where the appearance of the title is to be created. A list of the elements is displayed by using an icon at the lower portion. From the list, a user selects an element that is to be displayed. Further, a style creation button with which a style creation job is begun, and a title storage button with which the scenario of a created title is stored are provided at the right portion.

Figure 8:
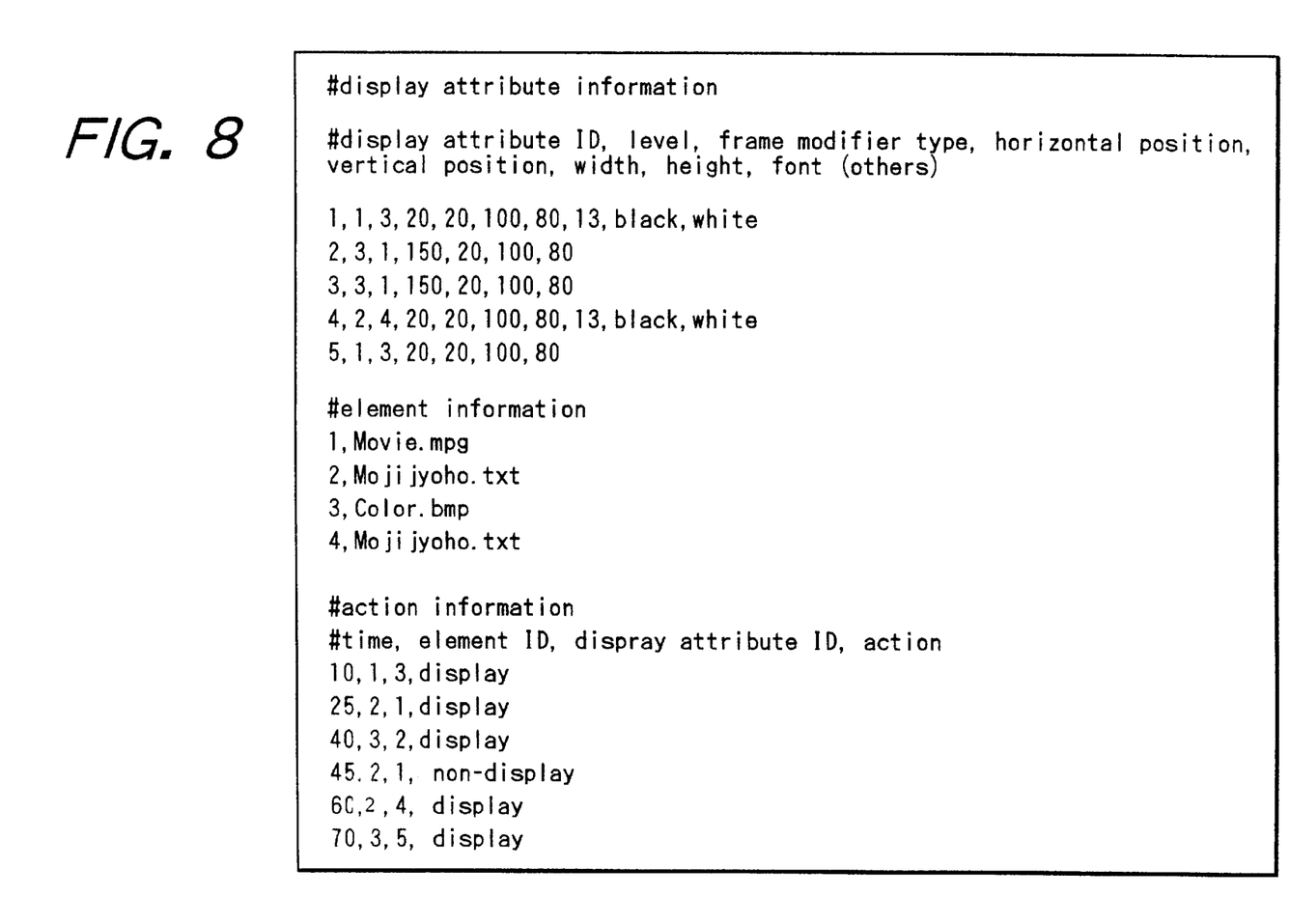
FIG. 8 is a diagram illustrating an example description of a scenario that is stored according to the first embodiment.

FIG. 8 is a diagram illustrating an example description of the stored scenario. The example scenario description will now be explained while referring to FIG. 8. Information of an element that is to be used, information for display attributes of individual elements and information of actions that are to be performed along the time axis are written in the scenario. Unique IDs are provided for the individual display attributes. Unique IDs are also provided for the elements. The IDs are used to write the action information of when and what action is to be performed by using what element and with what display attribute. The first line of the display attribute information represents that, for a display attribute with display attribute ID of 1, an element is to be displayed at the lowest level, with the display area frame modifier type being 3, the horizontal display position being 20 and the vertical position being 20, the width and the height being 100 and 80 , the font being 13 points, and a character color being black and a background color being white. The first line of the element information represents that an element having element ID of 1 is MOVIE.mpg and an element having element ID of 2 is MOJIJYOHO.txt. The second line of the action information represents that the element having element ID of 2, i.e., Mojijyoho.txt, is to be displayed with display attribute of 1 when 25 seconds elapse since the title reproduction, and is not to be displayed when 45 seconds elaspe, and is to be displayed again 60 seconds later.

An explanation will now be given for the process where the style determination means 108 changes the size of the display area in the style that is explained while referring to FIGS. 4 and 5, and stores a scenario. The second and fifth lines of the action information represent that the identical element having element ID 2 is displayed with different display attributes of display attribute IDs of 1 and 4. According to the first line in the display attribute information, the display attribute ID 1 indicates that the element is to be displayed at width 100 and height 80 at level 1. Similarly, display attribute ID 4 indicates that the element is to be displayed at width 100 and height 80 at level 3. According to the original style in FIG. 5, the display area at level 1 has width 100 and height 80, and the display area at level 3 has width 110 and height 90. In other words, although the display area of level 3 originally has width 110 and height 90, it is changed in consonance with the size of the element having element ID 2, i.e., the width 100 and the height 80. In this manner, in consonance with the element, the style determination means 108 changes the position and the size of the display area that is defined in the style, and the scenario is stored by the style storage means 109.

In the present invention, the style is handled in the same manner as for the other elements, and the style can be changed according to the time. Since the style is defined using a plurality of display areas, the style is substantially a set of display areas. In the process for storing the scenario of the title in which the change of a style during the title reproduction is included, the style is separated for each display area, and a display area that is employed is written as display area attribute information and action information in the scenario together with element information.

As is described above, according to this embodiment, first, for title creation, a style is selected from among the style components that are registered in advance and complicated setting can be eliminated. A user who is not skilled at creating a style can avoid difficult layout designing. Further, when this style is used, a title with the same appearance can be created at a number of times. For title creation, a display area for which a data type of an element is designated and in which the element can be displayed need be highlighted to suggest the title creation procedures to a user so as to assist the user to create a title. The user need only designate a display area of the style as a level at which the element is to be displayed, so that a title where the level is provided for an element display can be easily created. Since at the time of title creation, the style is re-determined in consonance with the element, various elements of different sizes can be employed even using the same style, and flexible title creation can be performed.

Embodiment 2

Figure 9:
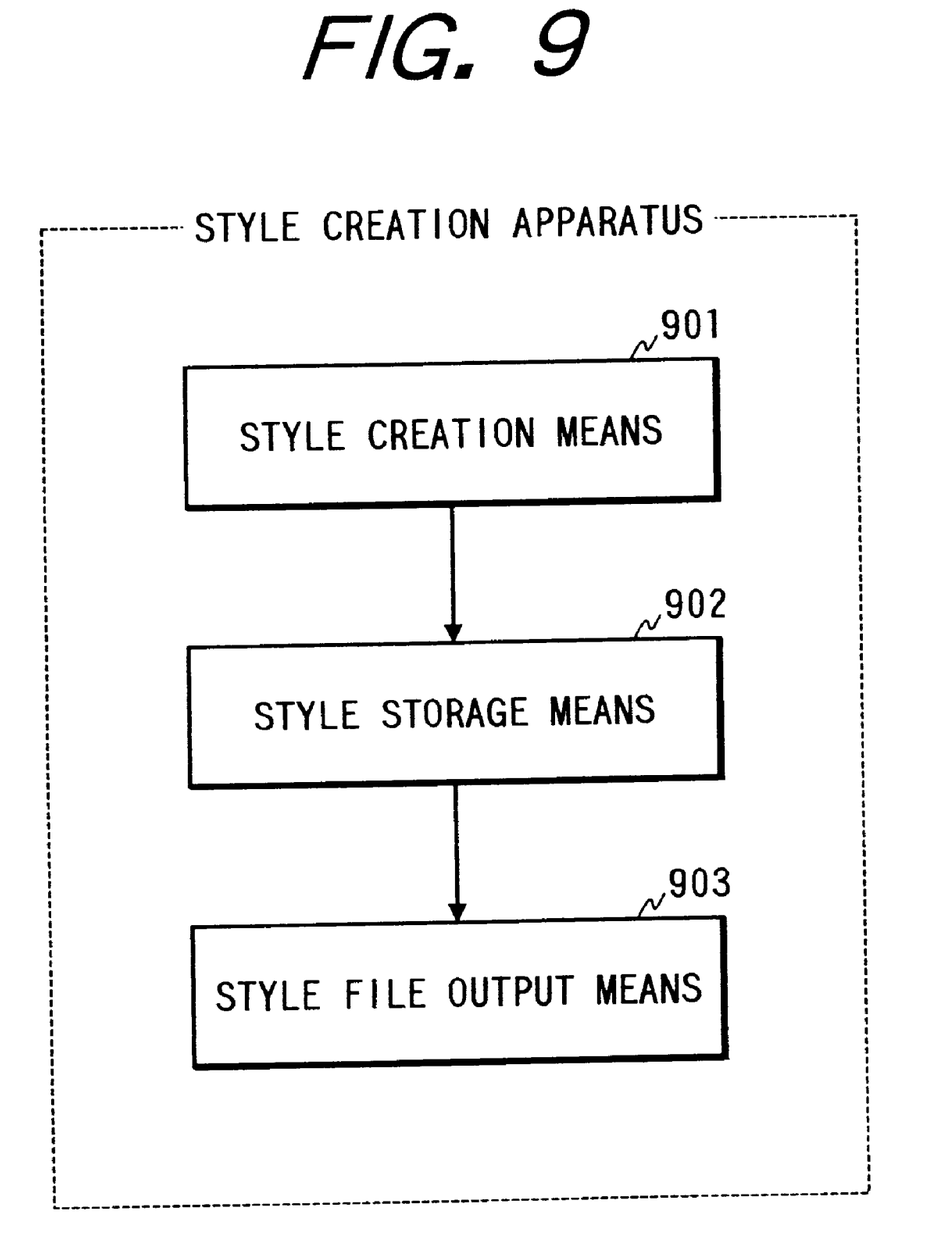
FIG. 9 is a block diagram illustrating the structure of a multi-media title editing apparatus according to a second embodiment of the present invention.

FIG. 9 is a block diagram illustrating the structure of a style creation device that is used for a multi-media title editing apparatus according to a second embodiment of the present invention. The second embodiment of the present invention will now be described while referring to FIG. 9. Reference numeral 901 denotes style creation means; 902, style storage means; and 903, style file output means for outputting prepared style information in a form of a file. A difference from the first embodiment shown in FIG. 1 is that the style creation device and the title creation device are independent and the style file output means is provided. The style file output means 903 receives a style, which is the output of the style storage means 902, and outputs it as a file.

As is described above, according to this embodiment, the creation of a style can be performed separately from the creation of a title. Therefore, the entire style creation process can be relied on a user who has a skill to create a style, and the efficiency in the job can be improved. Further, style information can be distributed in such a manner that various styles that are regarded as independent elements are exchanged among the other users, and creation of various styles and their employment is possible.

Embodiment 3

Figure 10:
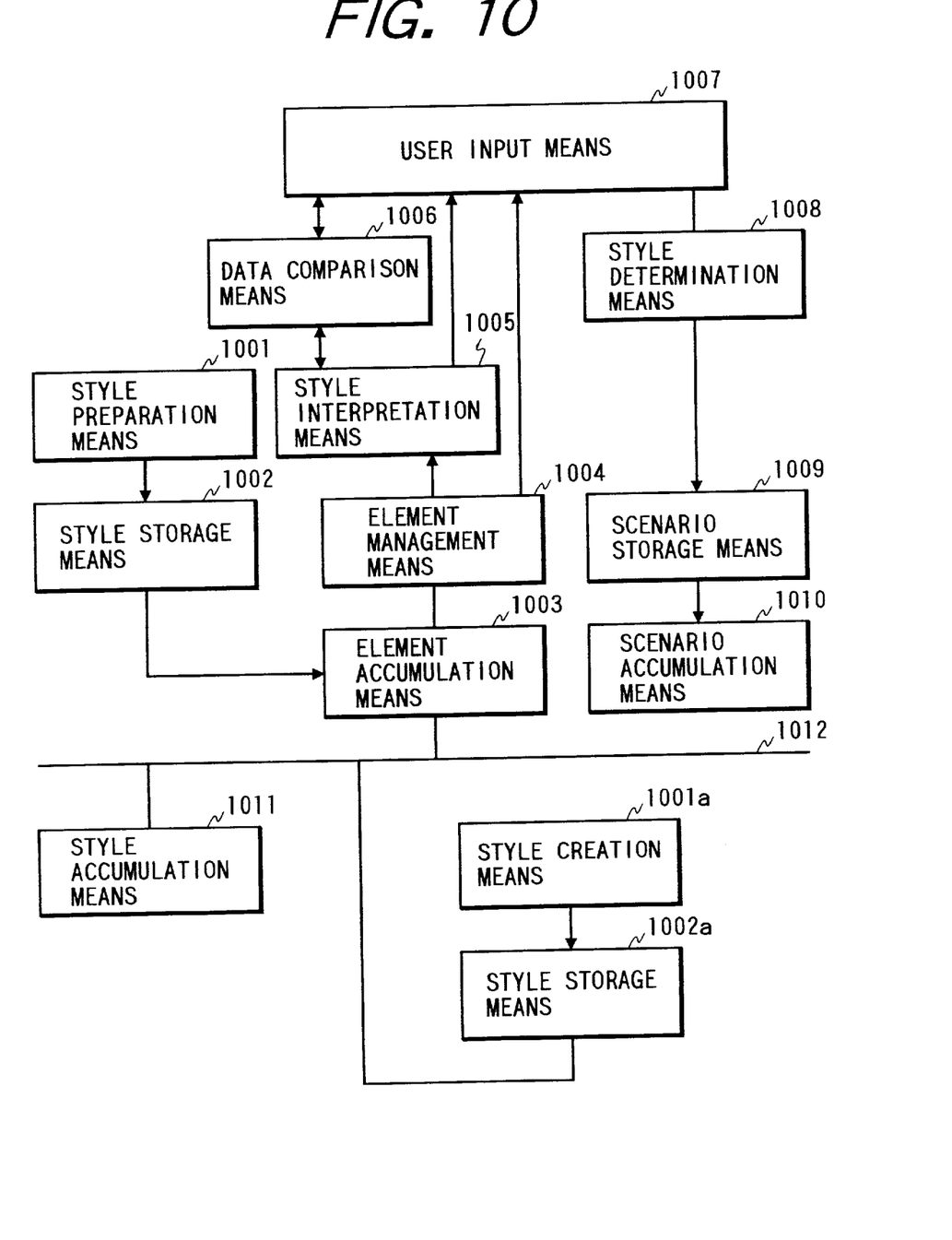
FIG. 10 is a block diagram illustrating the structure of a multi-media title editing apparatus according to a third embodiment of the present invention.

FIG. 10 is a block diagram illustrating the arrangement of a multi-media title editing apparatus according to a third embodiment of the present invention. The third embodiment of the present invention will now be described while referring to FIG. 10. The multi-media title edition system shown in FIG. 10 includes a multi-media title editing apparatus, which comprises: first style creation means 1001 for creating a style that defines a multi-media title screen by using a set of display areas for which methods for displaying various multi-media data are designated; first style storage means 1002 for storing a style that is created by the style creation means; element accumulation means 1003 for accumulating elements; element management means 1004; style interpretation means 1005 for interpreting a style; data comparison means 1006 for comparing a data type of a selected element with a data type that is designated for a display area in the style; user input means 1007 for creating a title; style determination means for re-determining attributes, such as the position and the size of each display area, when an element to be displayed in each display area is determined; scenario storage means 1009 for storing a scenario of a title that is created; and scenario accumulation means 1010 for accumulating a scenario that is created by the scenario storage means 1009, style accumulation means 1011, which is connected to the multi-media title editing apparatus across a network 1012, second style creation means 1OO1a, as well as the first style creation means 1001, for creating a style that defines a multi-media title screen by using a set of display areas for which methods for displaying various multi-media data, and second style storage means 1002a, as well as the first style storage means 1002, for storing a style that is created by the second style creation means 1OO1a, both means 1OO1a and 1002a communicating with the multi-media title editing apparatus and the style accumulation means 1011 across the network 1012.

The system in this embodiment is constructed by the multi-media title editing apparatus described in the first embodiment, and the second style creation means 1OO1a, the second style storage means 1002a and the style accumulation means 1011 for accumulating style information, the three of which are mutually connected to the multi-media title editing apparatus across the network 1012. The feature in this embodiment is that the devices communicate together across the network. A difference from the first embodiment is that the style accumulation means 1010 for accumulating style information is provided, and the second style creation means and the second style storage means are separated and communicate with the style accumulation means across the network. The style accumulation means 1010 receives a style from the style storage means 1002 and accumulates it internally. The style accumulation means 1010 outputs the internally stored style to the element accumulation means 1003.

The processing for this embodiment will now be described. In FIG. 10, a style that is created by the style creation means is transmitted to the style storage means and accumulated in the style accumulation means 1011 across the network. Before the multi-media title editing apparatus creates a title, it accesses the style accumulation means across the network to select a style. In this manner, a user can employ a style that is stored in the style accumulation means. At this time, a plurality of such style accumulation means may exist on the network. Similarly, a plurality of such multi-media title editing apparatuses and a plurality of style creation means and style storage means may be provided on the network.

As is described above, according to this embodiment, since the style accumulation means is provided on the network, a plurality of multi-media title editing apparatuses that are connected to the network can refer to styles in the style accumulation means and employ them. With this arrangement, in addition to the effect obtained in the second embodiment, the effects can be acquired such that title creation can be performed in parallel without interrupting the title creation, and that the styles acquired by a plurality of style creation devices can be immediately used at the same time by a plurality of multi-media title editing apparatuses.

As is described above, according to the present invention, a multi-media title creation and editing apparatus that forms a title by assembling, as title components, elements that are to be displayed in the title permits a user to easily repeat the creation of a title, which is conventionally difficult for a beginner to perform, that consists of elements having display attributes such as a level attribute.

It should be understood that the foregoing relates only to preferred embodiments of the present invention, and that it is intended to cover all changes and modifications of the embodiments of the invention herein used for the purpose of the disclosure, which do not constitute departures from the spirit and scope of the invention.

What is claimed is:

1. A multi-media title editing apparatus comprising:
   style creation means for creating a style in which a multi-media title screen is defined by using a set of display areas in which display methods for various multi-media data elements are designated;
   style storage means for storing said style that is created by said style creation means;
   element storage means for storing elements from which said multi-media data elements are selected;
   element management means for selecting one or more of said multi-media data elements in response to a user's command;
   style interpretation means for interpreting said style by detecting a type of multi-media data defined by said style for each of said display areas;
   user input means for creating a title, said user input means including a graphical user interface so that the user is able to input said user's command;
   data comparison means for comparing said type of each of said multi-media data defined by said style for each of said display areas with a type of data of said one or more of said elements selected by said element management means;
   indication means for indicating on said graphical user interface that a selected multi-media data element can be displayed at a selected one of said display areas when the data type of said selected multi-media data element is the same as that of said multi-media data defined by said style for each of said display areas; and
   scenario storage means for storing a scenario for said title, said scenario including a series of display commands which include a time at which a multimedia data element is to be displayed or not, an element ID indicative of said multi-media data element, a display attribute ID indicative of how to display said multi-media element with designation of one of said display areas, and action information by which said multi-media data element is to be displayed or not.

2. A multi-media title editing apparatus according to claim 1, wherein said style creation means employs, as one part of said style, information that concerns display levels for said display areas, and wherein said user input means provides a display in display areas in consonance with said display levels.

3. A multi-media editing apparatus according to claim 1, further comprising size/shape adjusting means for matching a characteristic of an element pasted on a display area to a corresponding display attribute of said display area by modifying one of said characteristic of the element and said display attribute of said display area, so that size and/or shape of said element pasted on said display area matches with size and/or shape of said display area
   wherein said characteristic of the element comprises at least one of said size and shape thereof.

4. A multi-media title editing apparatus comprising:
   style creation means for creating a style in which a multi-media title screen is defined by using a set of display areas in which display methods for various multi-media data elements are designated;
   style storage means for storing said style that is created by said style creation means;
   element storage means for storing elements from which said multi-media data elements are selected;
   element management means for selecting one or more of said multi-media data elements in response to a user's command;
   user input means for creating a title, said user input means including a graphical user interface so that the user is able to input said user's command; and
   scenario storage means for storing a scenario for said title, said scenario including a series of display commands each of which includes a time at which a multi-media data element is to be displayed or not, an element ID indicative of said multi-media data element, a display attribute ID indicative of how to display said multi-media element with designation of one of said display areas, and action information by which said multi-media data element is to be displayed or not;
   said scenario storage means thereby operating when a plurality of styles are employed for a single title having time base information, and when one of said styles is changed to another at a given instance, for storing said scenario including a command by which all of said elements which have been displayed till said given instance will not be displayed after said given instance.

5. A multi-media title editing apparatus according to claim 4, wherein said scenario storage means stores data identifying time elapsed from start of reproduction of a title for identifying the time at which said style is changed.

6. A multi-media title editing apparatus according to claim 4, wherein said scenario storage means stores a scenario including data arranged to identify a first time for beginning display of a display element with a first attribute.

7. A multi-media title editing apparatus according to claim 6, wherein said scenario storage means stores a scenario including data arranged to identify a second time for ending display of said display element, said second time being subsequent to said first time.

8. A multi-media title editing apparatus according to claim 7, wherein said scenario storage means stores a scenario including data arranged to identify a third time for beginning display of said display element, said third time being subsequent to said second time.

9. A multi-media title editing apparatus according to claim 7, wherein said scenario storage means stores a scenario including data arranged to identify a third time for beginning display of said display element with a second attribute different from said first attribute, said third time being subsequent to said second time.

10. A multi-media title editing apparatus according to claim 4, wherein said scenario storage means stores a scenario including data arranged to identify a time for ending display of a display element.

* * * * *